(12) United States Patent
Imai

(10) Patent No.: US 6,824,090 B2
(45) Date of Patent: Nov. 30, 2004

(54) REEL AND DRIVE DEVICE

(75) Inventor: Fumihito Imai, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/355,744

(22) Filed: Feb. 3, 2003

(65) Prior Publication Data

US 2003/0146336 A1 Aug. 7, 2003

(30) Foreign Application Priority Data

Feb. 6, 2002 (JP) ........................................ 2002-029148

(51) Int. Cl.$^7$ ................................................ G03B 1/58
(52) U.S. Cl. ................................ 242/332.7; 242/530.1; 242/586.6
(58) Field of Search ............................ 242/332.7, 332.8, 242/586.5, 586.6, 530.1, 530.2

(56) References Cited

U.S. PATENT DOCUMENTS

| | | | | |
|---|---|---|---|---|
| 1,346,356 A | * | 7/1920 | Wenderhold | 242/586.5 |
| 1,421,933 A | * | 7/1922 | Fulda | 242/586.6 |
| 2,225,433 A | * | 12/1940 | Goldberg | 242/332.7 |
| 3,691,315 A | * | 9/1972 | Ellmore | 242/332.7 |
| 3,697,679 A | * | 10/1972 | Hathaway | 242/332.7 |
| 3,752,416 A | * | 8/1973 | Fukatsu et al. | 242/332.8 |
| 3,807,652 A | * | 4/1974 | Kruhn et al. | 242/332.7 |
| 4,274,726 A | * | 6/1981 | Yoneyama et al. | 242/332.7 |
| 4,396,164 A | * | 8/1983 | Maeda et al. | 242/586.5 |
| 4,426,047 A | | 1/1984 | Richard et al. | |

* cited by examiner

*Primary Examiner*—William A. Rivera
(74) *Attorney, Agent, or Firm*—Sughrue Mion, PLLC

(57) ABSTRACT

In order that, it is prevented that a region on a recording tape on which information cannot be recorded is generated or information recorded on the recording tape is lost doe to preventing that deformed portion is generated on the recording tape, and it is possible to easily read data from or write data on a recording tape cartridge in a short time, a drive device comprising a hub of the reel, on which a plurality of holding portions, for holding leader members to which distal ends of the recording tapes are attached, are formed, and on which the recording tapes are wound, and flexible members of the same number of the holding portions, wound on a peripheral surface of the hub by the recording tapes wound on peripheral surfaces thereof so as to cover the respective holding portions, is provided.

38 Claims, 12 Drawing Sheets

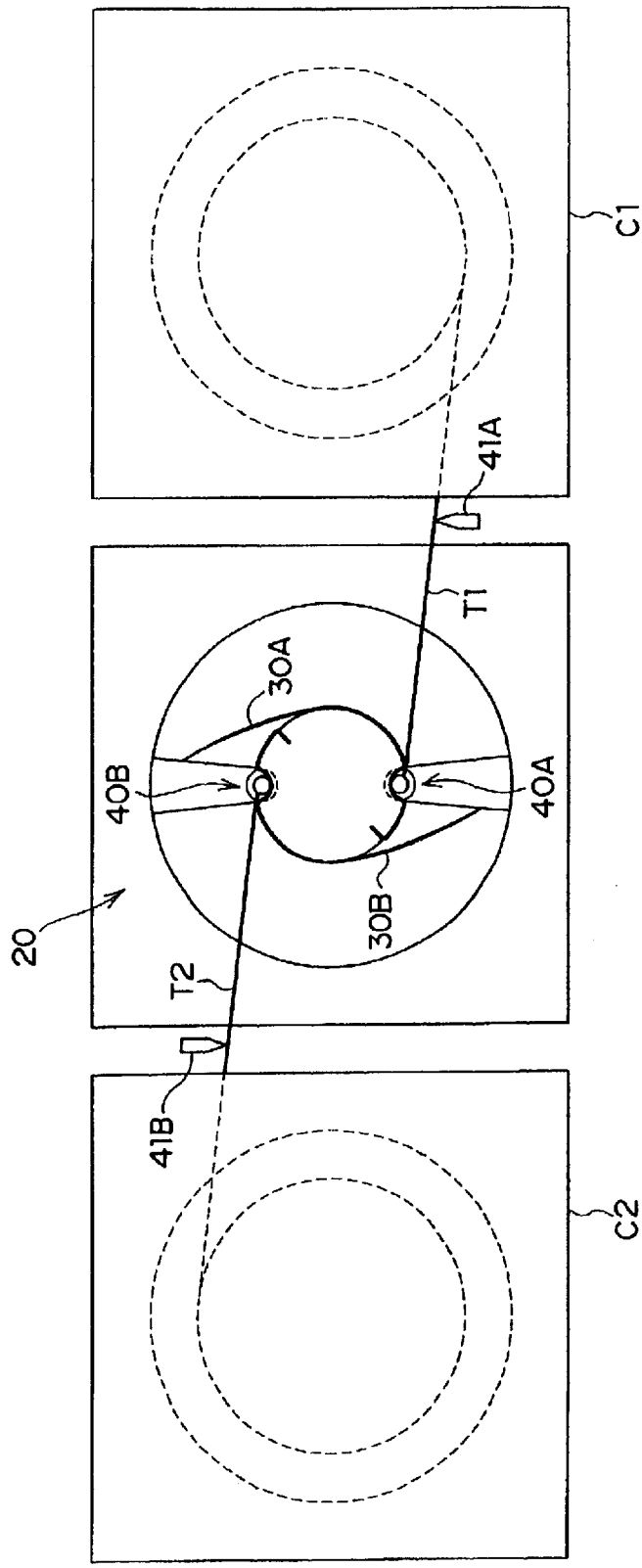

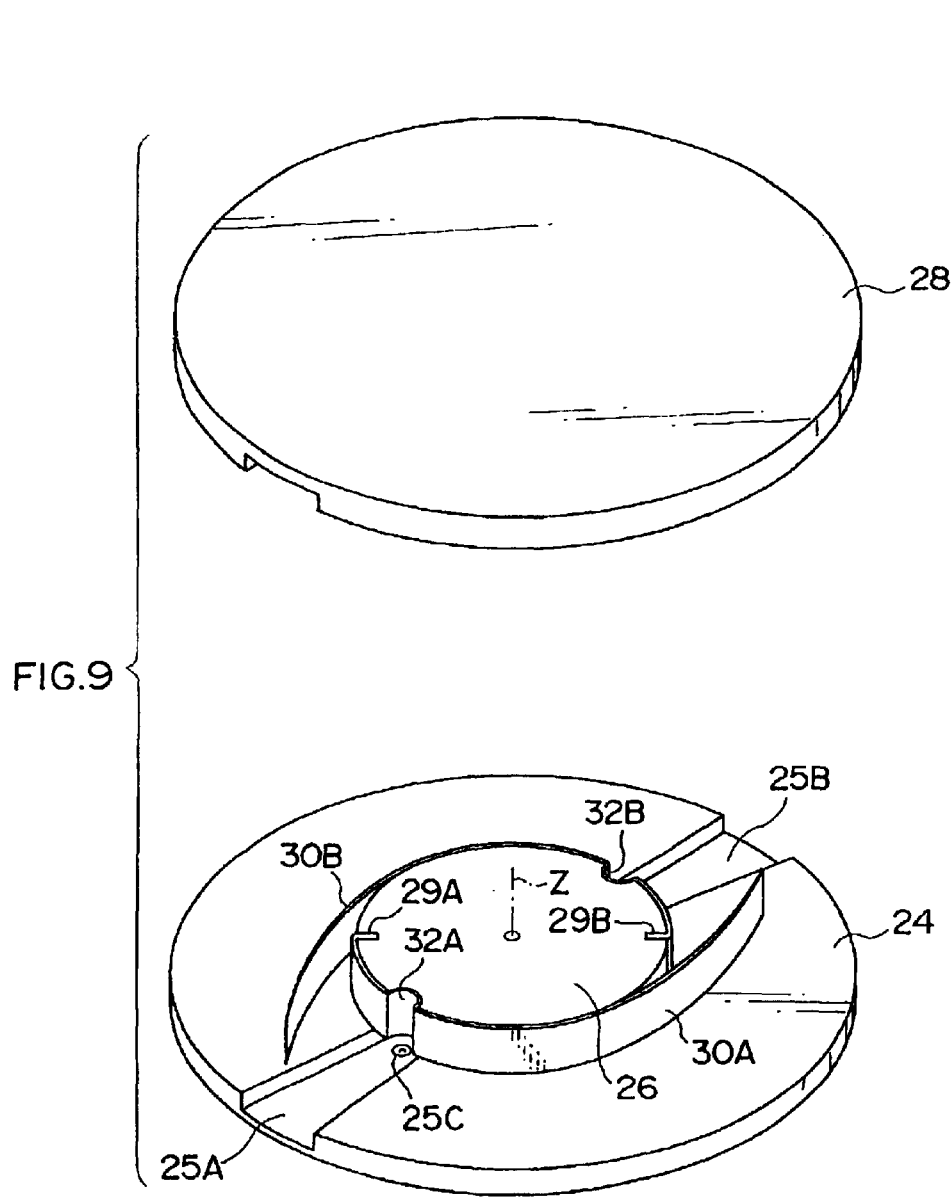

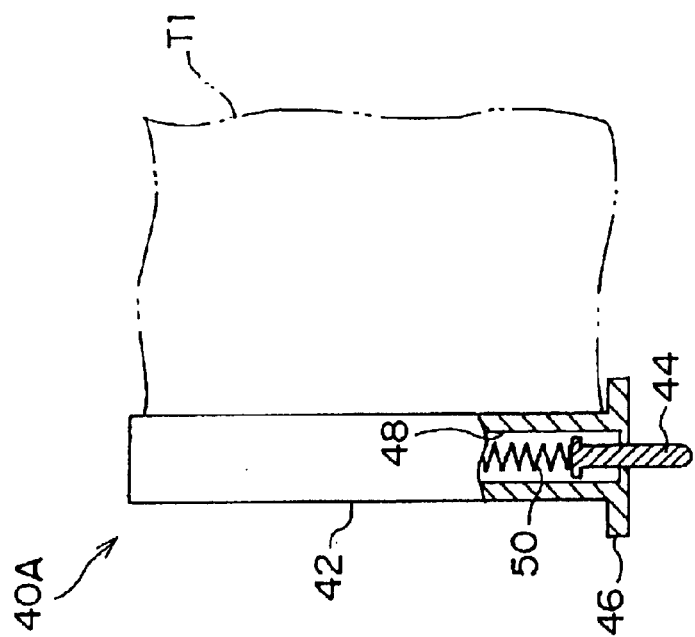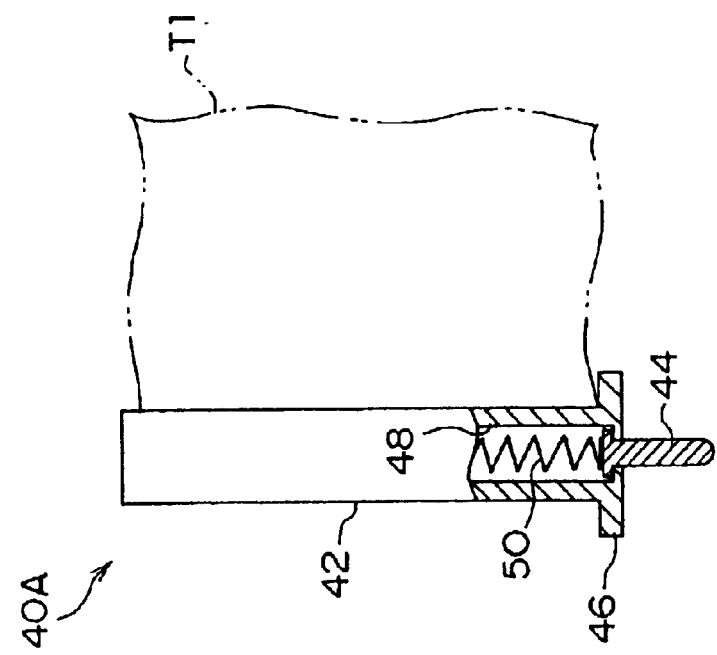

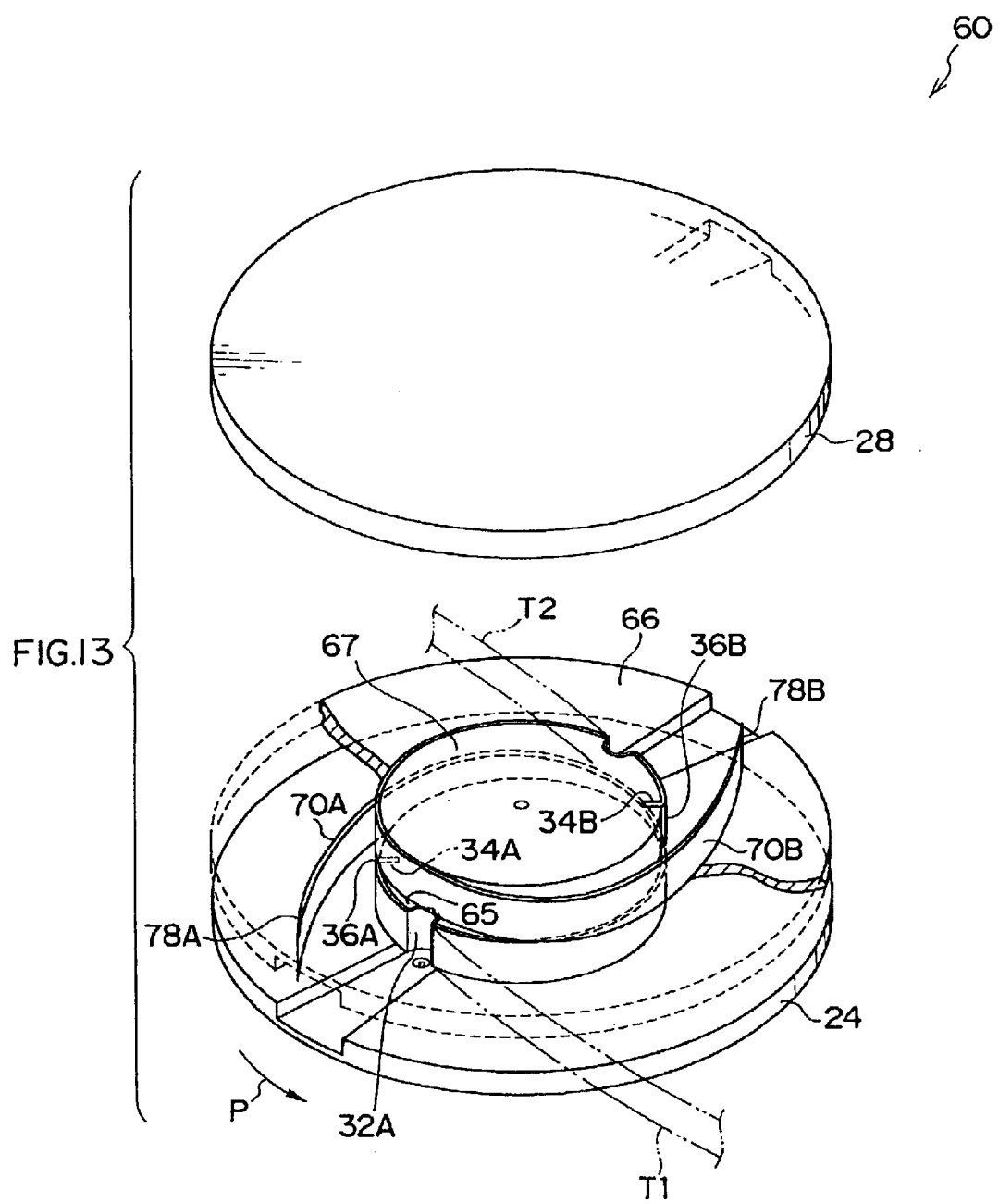

REEL AND DRIVE DEVICE

BACKGROUND OF THE INVENTION

1. Field of the Invention

The present invention relates to a reel and a drive device having the reel on which is wound a recording tape.

2. Description of the Related Art

A recording tape such as magnetic tapes and the like are used as an external recording medium for computers and the like. Such recording tape has large recording surface area, and is mainly used as recording medium for back-up of large volumes of information. Accordingly, it is preferred to prevent the recording tape from being adhered thereto dust or dirt, and it is also preferred that accommodating space for storage is smaller.

For the above reason, a recording tape cartridge, in which a recording tape is wound on a single reel and which rotatably contains the reel in a case, is adopted. The case of this recording tape cartridge can prevent the recording tape from being adhered thereto dust or dirt. Further, comparing this recording tape cartridge (a single-reel cartridge) with a recording tape cartridge in which, in addition to the first reel, a second reel for retracting the recording tape at a time when information is to be recorded on or played back from the recording tape is provided (a two-reel cartridge), accommodating space for storage of the two-reel cartridge can become substantially the half of that of the single-reel cartridge.

A recording tape cartridge provided with a leader block connected directly to a tip end (a free end) of a recording tape or connected to the tip end of the recording tape via a leader tape or the like, is known. The leader block is held at outside an opening (held at in the vicinity of the opening), from which the recording tape is drawn, provided at the case of the recording tape cartridge. The leader block functions as an operating member when the recording tape is drawn from the case. Also, the leader block functions as a closing member for closing the opening from which the recording tape is drawn.

The recording tape cartridge described above is loaded into a drive device at the time when information is to be recorded on the recording tape or when the information is to be reproduced from the recording tape on which the information is recorded. In the drive device to which the recording tape cartridge is loaded, a pulling out device operates the leader block to draw the recording tape from the case, and the recording tape is guided along a predetermined tape path to accommodate the leader block in a hub (a reel hub) of a machine reel (a take-up reel).

This state will be explained base on FIG. 14A. A concave portion 100 is formed at a leader block 106 at a central position in a longitudinal direction of the leader block 106. A tip end of a recording tape 104 is connected to the concave portion 100 via a clamp pin 102. The leader block 106 is accommodated in a fitting portion 112 provided at a hub 110 of a machine reel 108 (hereinafter, a reel 108). An end surface of the leader block 106, positioned at an opening end of the fitting portion 112, is an arc-curvature surface 116 corresponding to a peripheral surface 114 of the hub 110. The arc shaped curvature surface 116, together with the peripheral surface 114, forms a winding surface 118, on which the magnetic tape 104 is wound, having a substantially circle configuration in plane view. The magnetic tape 104 is wound on the winding surface 118 by driving to rotate the reel 108 (the hub 110) within the drive device.

However, an arc length of the curvature surface 116, formed at the end surface in the longitudinal direction of the leader block 106 and forming a part of the winding surface 118, is short. In other words, a protrude-length (a protrude-distance in radial direction) "a" of the arc-curvature surface 116 from the opening edge of the fitting portion 112 is small, as shown in FIG. 14A. Accordingly, as shown in FIG. 14B, it may occur that the arc-curvature surface 116 is positioned within the fitting portion 112 (the arc-curvature surface 116 does not protrude from the fitting portion 112) even if an accommodated position of the leader block 106 in the fitting portion 112 is merely slightly shifted from a proper position.

In this case, a folded portion (deformed portion) is generated on the recording tape 104 by the opening edge of the fitting portion 112. Due to this folded portion, in similar way, other folded portions are generated at portions, corresponding to the opening edge of the fitting portion 112, of the recording tape 104 wound further on the hub 110. These folded portions of the recording tape 104 are in substantial recording-region of the tape. Therefore, regions on the recording tape 104 on which information cannot be recorded may be generated or information recorded on the recording tape 104 may be lost, due to the folded portions of the recording tape 104. Because a distance between said portion of the recording tape 104 and a recording and reproducing (play back) head is not a proper distance at the time of recording the information or playing back the information.

On the other hand, as shown in FIG. 14C, in a case in which the accommodated position of the leader block 106 in the fitting portion 112 is shifted from the proper position, and the curvature surface 116 protrudes further than the peripheral surface 114 of the hub 110, the recording tape 104 is wound along a protruded portion (a stepped portion) of a small zone on the winding surface 118, with a curvature that is larger than a predetermined winding curvature due to the arc length of the curvature surface 116 being short. Namely, the recording tape 104 is deformed at the protruded portion. In this case, due to this deformed portion of the recording tape 104, more deformed portions are generated at portions of the recording tape 104 wound further on the hub 110, in the similar way of the case described above. Therefore, regions on the recording tape 104 on which information cannot be recorded may be generated or information recorded on the recording tape 104 may be lost, due to these deformation.

Even in a case in which a leader pin (not the leader block) is attached to the tip end of the recording tape, namely, in a case in which the leader pin is pulled out from the case by the drawing device of the drive device, the leader pin is held at a holding portion provided at the hub, and the recording tape is wound by driving to rotate the machine reel, there is a stepped portion (an uneven portion) at the holding portion. Accordingly, the same problems mentioned above arise in this case.

Further, because data capacity recordable on single recording tape cartridge is not so large. Accordingly, if information cannot be recorded on single one recording tape cartridge because the data amount of the information is large, the information is divided such that the information is recorded on a plurality of the recording tape cartridges. In this case, because the conventional drive device cannot read data from or write data on a plurality of the recording tape cartridges at the same time, only single recording tape cartridge is loaded or ejected in, for example, one winding operation. Namely, the plurality of the recording tape cartridges cannot be loaded or ejected at one back up operation. Accordingly, there are problems that it takes long time to read or write information, further, operation of loading or ejecting the recording tape cartridge is troublesome.

SUMMARY OF THE INVENTION

In view of the aforementioned, an object of the present invention is to provide a reel and a drive device preventing that a region of a recording tape on which information cannot be recorded is generated or information recorded on the recording tape is lost by preventing deformation of the recording tape, and which can easily read data from or write data on a recording tape cartridge in a short time.

The inventor of the present invention takes note that even if a stepped portion (an uneven portion) is formed at a holding portion provided at a hub, in a state in which the recording tape is wound on a reel to form many layers of the recording tape on the hub, further deformed portion is not generated on the recording tape. The inventor further takes note that the reel must be rotated to wind the recording tape. The inventor takes those into consideration, and invents that the uneven portion is eliminated at the time of this operation, and a plurality of the recording tapes can be wound on a single reel, and accomplishes the present invention.

A first aspect of the present invention is a drive device having a reel on which recording tapes are wound, the drive device comprising: a hub of the reel, on which a plurality of holding portions, for holding leader members to which distal ends of the recording tapes are attached, are formed, and on which hub the recording tapes are wound; and flexible members of a number equal to a number of the holding portions, which flexible members are wound on a peripheral surface of the hub by the recording tapes from peripheral surface sides so as to cover the respective holding portions.

In a second aspect of the present invention according to the first aspect, a plurality of the recording tapes are wound on the same peripheral surface of the hub.

In a third aspect of the present invention according to the second aspect, a plurality of recording tape cartridges of the recording tapes are accommodated at the same side with respect to the reel.

In a fourth aspect of the present invention according to the second aspect, a plurality of recording tape cartridges of the recording tapes are accommodated at opposite sides with respect to the reel.

In a fifth aspect of the present invention according to the fourth aspect, the plurality of recording tape cartridges of the recording tapes are accommodated at substantially symmetrical positions with respect to the reel.

In a sixth aspect of the present invention according to the first aspect, a plurality of the recording tapes are respectively wound on peripheral surfaces of the hub that differ in a direction of a rotation axis of the hub.

In a seventh aspect of the present invention according to the sixth aspect, a plurality of recording tape cartridges of the recording tapes are accommodated at the same side with respect to the reel.

In an eighth aspect of the present invention according to the sixth aspect, a plurality of recording tape cartridges of the recording tapes are accommodated at opposite sides with respect to the reel.

In a ninth aspect of the present invention according to the eighth aspect, the plurality of recording tape cartridges of the recording tapes are accommodated at substantially symmetrical positions with respect to the reel.

A tenth aspect of the present invention is a reel on which recording tapes are wound, the reel comprising: a hub, on which a plurality of holding portions, for holding leader members to which distal ends of the recording tapes are attached, are formed, and on which hub the recording tapes are wound; and flexible members of a number equal to a number of the holding portions, which flexible members are wound on a peripheral surface of the hub by the recording tapes from peripheral surface sides so as to cover the respective holding portions.

In an eleventh aspect of the present invention according to the tenth aspect, a plurality of the recording tapes are wound on the same peripheral surface of the hub.

In a twelfth aspect of the present invention according to the eleventh aspect, the reel comprises a first flexible member and a second flexible member, and two recording tapes are wound on the hub, in which hub, a first holding portion; a second holding portion; a first engaged portion in which the first flexible member is engaged; and a second engaged portion in which the second flexible member is engaged, are formed, wherein the first holding portion and the second holding portion are formed in the hub at substantially symmetrical positions with respect to a rotation axis of the hub, and the first engaged portion and the second engaged portion are formed in the hub at substantially symmetrical positions with respect to a rotation axis of the hub.

In a thirteenth aspect of the present invention according to the twelfth aspect, the first flexible member covers the second holding portion and the second engaged portion, and the second flexible member covers the first holding portion and the first engaged portion.

In a fourteenth aspect of the present invention according to the twelfth aspect, thicknesses of tip end portions of the first flexible member and the second flexible member are respectively gradually thinner toward tip ends thereof.

In a fifteenth aspect of the present invention according to the tenth aspect, a plurality of the recording tapes are respectively wound on peripheral surfaces of the hub that differ in a direction of a rotation axis of the hub.

In a sixteenth aspect of the present invention according to the fifteenth aspect, the hub comprises an upper hub disposed at an upper position in a direction of the rotation axis of the hub and a lower hub disposed at a lower position, two recording tapes being respectively wound on the upper hub and the lower hub.

In a seventeenth aspect of the present invention according to the sixteenth aspect, the reel comprises a first flexible member and a second flexible member, and in the upper hub, a first holding portion; and a first engaged portion in which the first flexible member is engaged, are formed, and in the lower hub, a second holding portion; and a second engaged portion in which the second flexible member is engaged, are formed.

In an eighteenth aspect of the present invention according to the seventeenth aspect, the first flexible member covers the first holding portion and the first engaged portion, and the second flexible member covers the second holding portion and the second engaged portion.

A nineteenth aspect of the present invention is a drive device having a reel on which recording tapes are wound, the drive device comprising a hub of the reel, on which a plurality of holding portions, for holding leader members to which distal ends of the recording tapes are attached, are formed, and on which the recording tapes are wound.

A twentieth aspect of the present invention is a reel on which recording tapes are wound, the reel comprising a hub, on which a plurality of holding portions, for holding leader members to which distal ends of the recording tapes are attached, are formed, and on which the recording tapes are wound.

In the present invention, the plurality of the recording tape cartridges can be loaded in the drive device. The leader members are drawn from the plurality of the recording tape cartridges loaded on the drive device, and the leader members are held on the plurality of holding portions. Namely, a plurality of drawing and holding mechanisms are provided in the drive device. Therefore, when comparing this system with a system in which single drawing and holding mechanism is provided in the drive device, time necessary to draw the leader members and to hold the same on the hub can be reduced in this system in a case in which the plurality of the recording tape cartridges are to be handled.

Because the flexible members are accordingly wound, together with winding of the recording tapes, the recording tapes wound on the peripheries of the flexible members do not contact with the holding portions. Accordingly, the recording tapes do not contact with the uneven portions formed at the holding portions. Accordingly, it is possible to prevent occurrence of deformations of the recording tapes wound on the reel. Therefore, it is possible to prevent that regions of the recording tapes on which information cannot be recorded are generated or information recorded on the recording tapes is lost.

Further, because the plurality of the recording tapes are wound on the single reel, time necessary to read data or write data from the plurality of the recording tapes can be reduced according to a number of the recording tapes wound at the same time. Namely, in a case in which two recording tapes are wound on the single reel at the same time, time necessary to read data or write data from the two recording tapes can be the half. Further, because the plurality of the recording tape cartridges can be loaded or ejected at the same time in, for example, one winding operation, operation of loading or ejecting the plurality of the recording tape cartridges becomes easier and is not so troublesome.

It is possible that the upper flange and the lower flange are integrated with the hub in the reel, also, it is possible that the upper flange and the lower flange are not integrated with the hub in the reel. Further, it is possible that the reel includes only one of the upper flange or the lower flange, or does not include both the upper flange and the lower flange, as long as the recording tapes are wound on the peripheral of hub preferably.

It is preferable that the thicknesses of the distal end portions of the flexible members become gradually thinner toward the respective distal ends thereof. By this structure, it is prevented that uneven portions are formed at respective portions of the recording tapes, positioned outside the respective distal end portions. Further, it is prevented that uneven portions are formed at respective portions of the recording tapes abutted outside those respective portions of the recording tapes.

BRIEF DESCRIPTION OF THE DRAWINGS

FIG. 8 is a schematic plane view illustrating structure of a drive device explained in a first example.

FIG. 9 is an development perspective view illustrating a reel explained in the first example.

FIG. 10A is a side cross-sectional view illustrating a leader pin explained in the first example in a state in which a leg portion of the leader pin is extended from a leader pin main body.

FIG. 10B is a side cross sectional view illustrating the leader pin in a state in which the leg portion of the leader pin is pressed into the leader pin main body.

FIG. 13 is an development perspective view illustrating a reel explained in the second example.

DESCRIPTION OF THE PREFERRED EMBODIMENT

Embodiments of the present invention will be given hereinafter.

A First Embodiment

Figure 1:
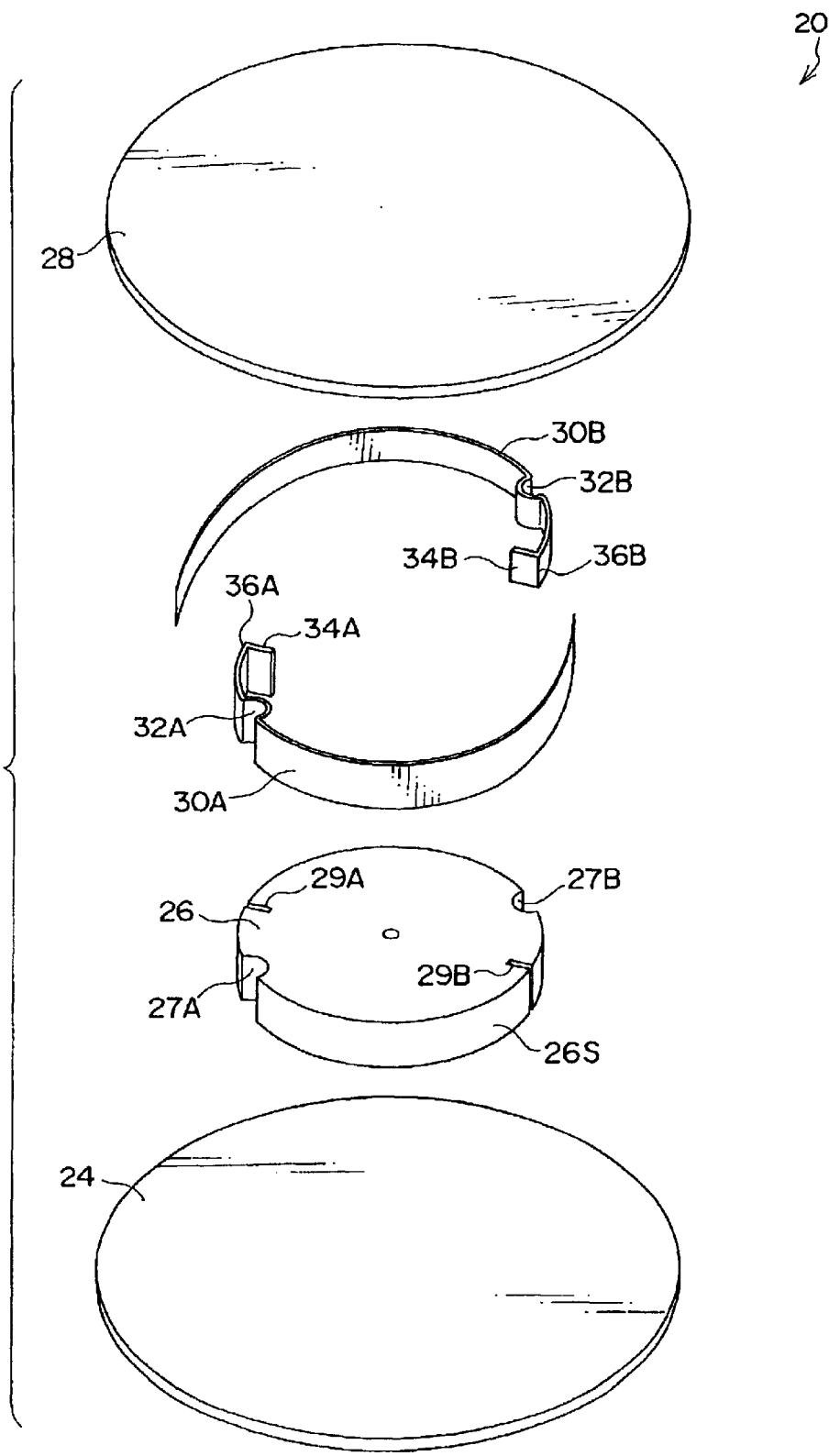
FIG. 1 is an development perspective view illustrating a reel of a drive device explained in a first embodiment.
Figure 2:
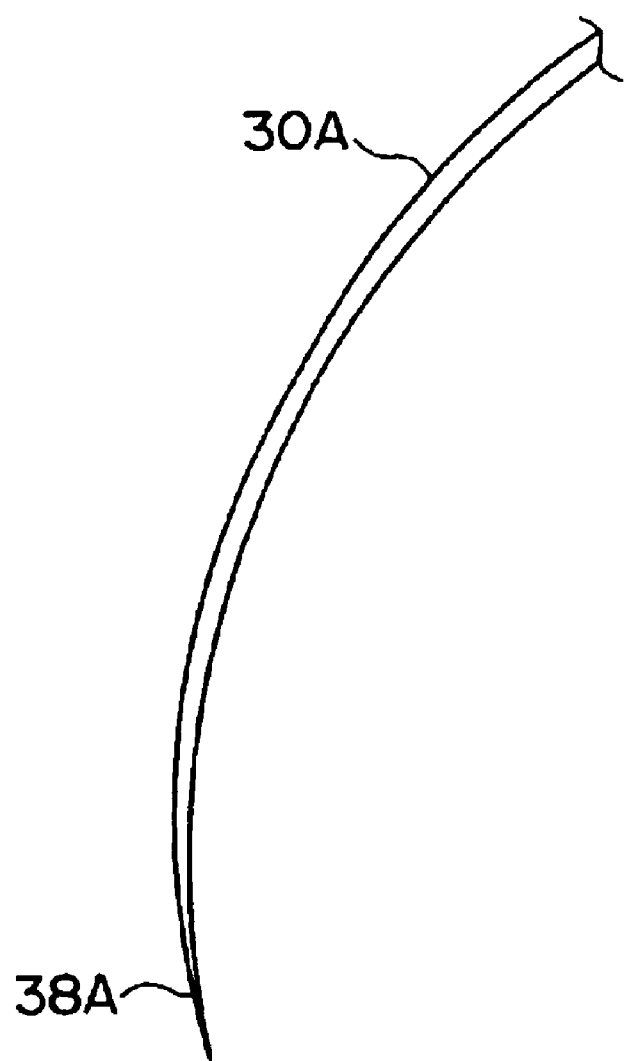
FIG. 2 is a partial enlarged plane view illustrating a tip end portion of a power spring.

The first embodiment of the present invention will be explained. A drive device described as the first embodiment of the present invention is a device in which two magnetic tape cartridges are loaded. A machine reel 20 (see FIG. 1, hereinafter, a reel 20) is rotatably supported within the device. The reel 20 winds or unwinds recording tapes of two magnetic tape cartridges which are loaded in the device.

The reel 20 comprises a lower flange 24, a hub 26, an upper flange 28, and two power springs 30A and 30B. The hub 26 is attached to an upper side of the lower flange 24. The upper flange 28 is attached to an upper side of the hub 26 in attachable and detachable manner. The power springs 30A and 30B are attached to the hub 26, and can be wound along a circumference surface (an outer peripheral surface) 26S of the hub 26.

A concave portion 27A is formed in the hub 26, and an accommodating concave portion 32A, which corresponds to (matches) the concave portion 27A, is formed in the power spring 30A. A leader pin 40A of the magnetic tape cartridge, drawn by a drawing device provided in the device, is accommodated in the accommodating concave portion 32A. Also, a fitted groove 29A, into which a base end portion 34A of the power spring 30A is fitted, is formed in the hub 26. The power spring 30A is bent to form a corner portion 36A thereat, such that the base end portion 34A is fitted into the fitted groove 29A.

In the similar way, a concave portion 27B is formed in the hub 26, and an accommodating concave portion 32B, which corresponds to the concave portion 27B, is formed in the power spring 30B. A leader pin 40B of the magnetic tape cartridge is accommodated in the accommodating concave portion 32B. Also, a fitted groove 29B, into which a base end portion 34B of the power spring 30B is fitted, is formed in the hub 26. The power spring 30B is bent to form a corner portion 36B thereat, such that the base end portion 34B is fitted into the fitted groove 29B.

Figure 3:
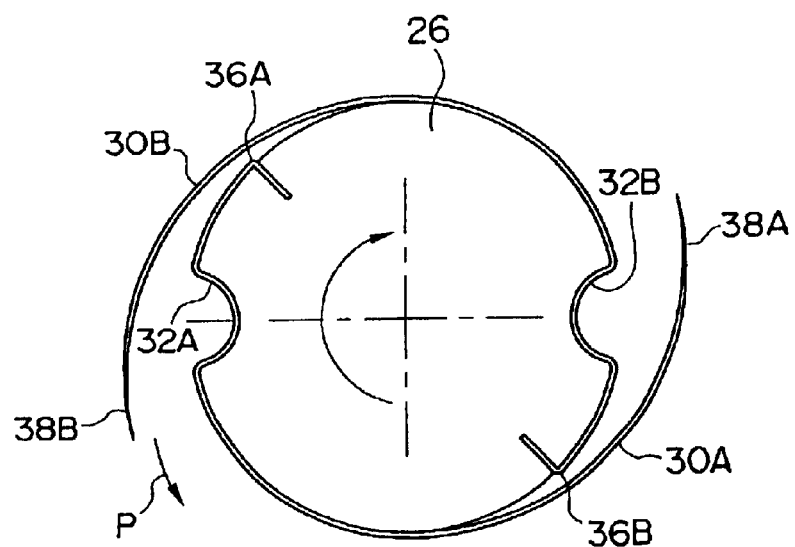
FIG. 3 is a plane view illustrating a state in which leader pins are not held at the reel in the first embodiment.

Further, a length of the power spring 30A is set such that a distal end portion 38A of the power spring 30A is positioned at a point which is beyond the corner portion 36B and the accommodating concave portion 32B in a tape winding direction (in a direction shown by an arrow P in FIG. 3) in a state in which the power spring 30A is wound on the hub 26 by one of two magnetic tape, namely, a magnetic tape T1 (see FIGS. 4–7). Here, the tape winding direction is a direction opposite to a reel rotating direction Q (see FIG. 3).

In the similar way, a length of the power spring 30B is set such that a distal end portion 38B of the power spring 30B is positioned at a point which is beyond the corner portion 36A and the accommodating concave portion 32A in the tape winding direction in a state in which the power spring 30B is wound on the hub 26 by the other of two magnetic tape, namely, a magnetic tape T2 (see FIGS. 4–7).

In order that a step (an uneven portion) is not formed when the magnetic tape is wound from the outside of the distal end portion 38A of the power spring 30A, the distal end portion 38A is subject to grinding process such that a thickness of the distal end portion 38A becomes gradually thinner toward the distal end thereof. At a time of the grinding processing, the process is carefully performed such that burr and the like is not generated on the distal end portion 38A. In the similar way, the distal end portion 38B is subject to grinding process such that a thickness of the distal end portion 38B becomes gradually thinner toward the distal end thereof.

Next, an operation of the first embodiment will be described.

In the drive device described above, in a state in which the magnetic tape cartridge is not loaded on the drive device, the accommodating concave portion 32A of the power spring 30A is entered into the concave portion 27A of the hub 26. Further, in this state, the distal end portion 38A of the power spring 30A is slightly apart from the hub 26 such that the leader pin 40B of the magnetic tape cartridge can be conveyed to the accommodating concave portion 32B by the drawing device (see FIG. 3). Moreover, in this state, the upper flange 28 is not mounted on the reel 20. In the similar way, in a state in which the magnetic tape cartridge is not loaded on the device, the accommodating concave portion 32B of the power spring 30B is entered into the concave portion 27B of the hub 26, the distal end portion 38B of the power spring 30B is slightly apart from the hub 26.

Figure 4:
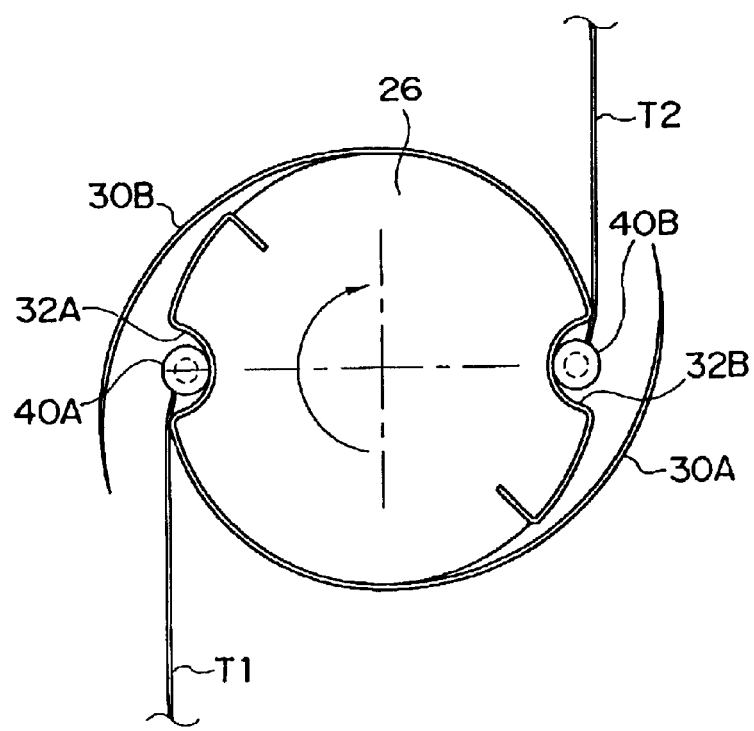
FIG. 4 is a plane view illustrating a state in which the leader pins are held at respective accommodating concave portions of the reel in the first embodiment.

When the magnetic tape cartridges are loaded on the device, and the leader pins 40A and 40B of the respective magnetic tape cartridges are drawn by the drawing device (for example, an arm or a cam), the leader pins 40A and 40B are conveyed to the respective accommodating concave portions 32A and 32B, and then, the leader pins 40A and 40B are held at the respective accommodating concave portions 32A and 32B (see FIG. 4).

Further, the upper flange 28 is attached to an upper surface side of the hub 26 by a cam or the like in the drive device. Note that it is possible that the device (the reel 20) is not provided with the upper flange 28.

Figure 5:
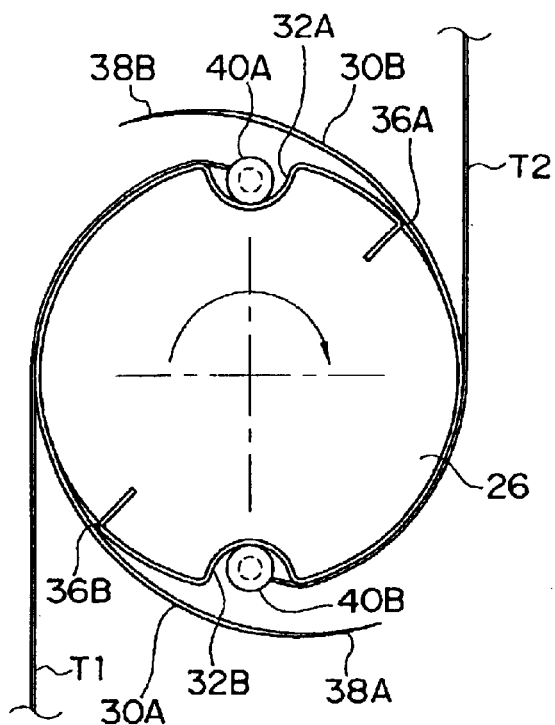
FIG. 5 is a plane view illustrating a state in which, rotation of the reel is started and recording tapes are wound on the reel from the state illustrated in FIG. 4.

When rotation of the reel 20 is started, the leader pins 40A and 40B are moved in the rotating direction of the reel 20 following with the rotation of the reel 20 (see FIG. 5).

Figure 6:
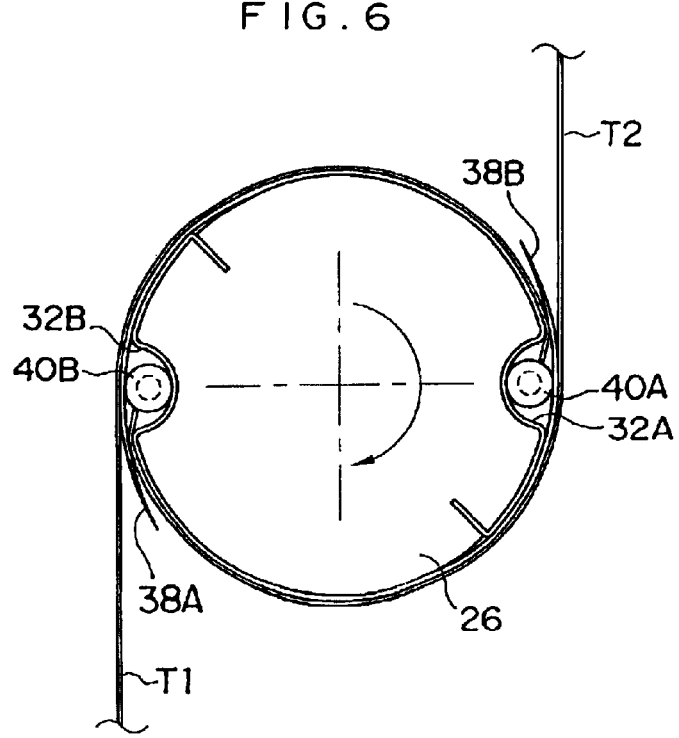
FIG. 6 is a plane view illustrating a state in which, the reel is further rotated and the recording tapes are wound on the reel from the state illustrated in FIG. 5.

When the reel 20 further rotates, the distal end portion 38A of the power spring 30A is urged toward the circumference surface of the hub 26 by the magnetic tape T1 located outside the power spring 30A, also, the distal end portion 38B of the power spring 30B is urged toward the circumference surface of the hub 26 by the magnetic tape T2 located outside the power spring 30B (see FIG. 6).

Figure 7:
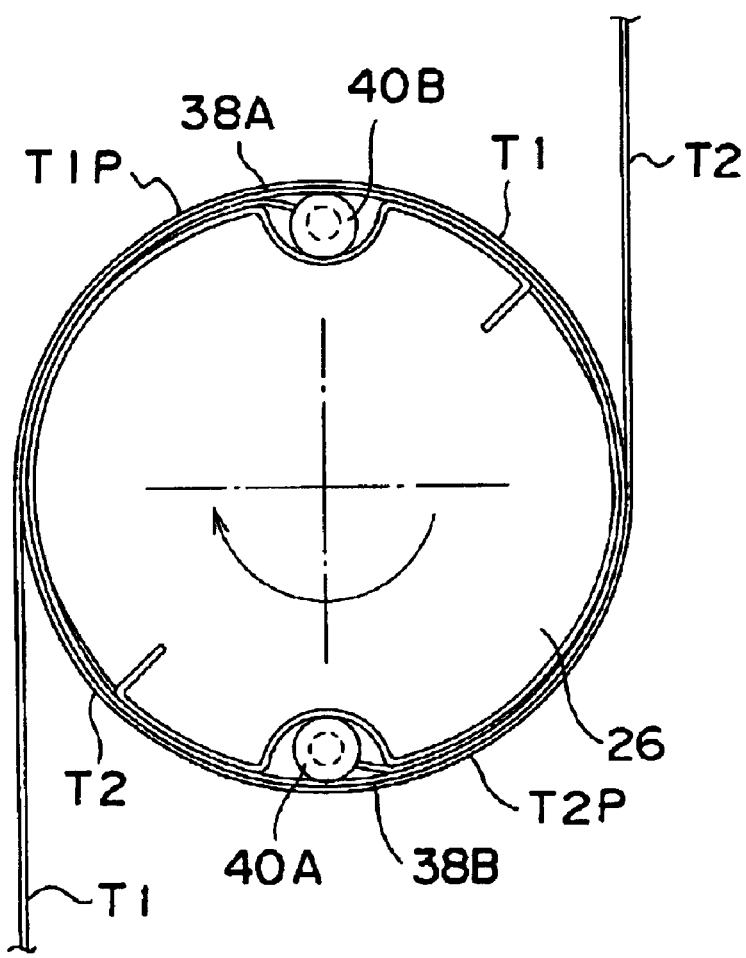
FIG. 7 is a plane view illustrating a state in which, the reel is further rotated and the recording tapes are wound on the reel from the state illustrated in FIG. 6.

When the reel 20 moreover rotates, as shown in FIG. 7, the distal end portion 38A of the power spring 30A abuts an outer surface of the magnetic tape T2 which has been wound already, then the magnetic tape T1 is wound from an outer surface side of the distal end portion 38A of the power spring 30A. In the similar way, the distal end portion 38B of the power spring 30B abuts an outer surface of the magnetic tape T1 which has been wound already, then the magnetic tape T2 is wound from an outer surface side of the distal end portion 38B of the power spring 30B.

Because the thicknesses of the distal end portions 38A and 38B become gradually thinner toward the respective distal ends, it is prevented that uneven portions are formed at respective portions T1P and T2P of the magnetic tapes, positioned outside the respective distal end portions 38A and 38B. Further, it is prevented that uneven portions are formed at respective portions of the magnetic tapes wound outside the respective portions T1P and T2P of the magnetic tapes.

As described above, in the present embodiment, because the two power springs 30A and 30B are respectively wound on the hub 26 by the two magnetic tapes T1 and T2, outside portions of the corner portions 36A and 36B formed by bending process such that the base end portions 34A and 34B engage into the hub 26, and outside portions of the accommodating concave portions 32A and 32B which accommodate the leader pins 40A and 40B, are covered by the wound power springs 30A and 30B. (Namely, the outside portion of the corner portion 36A and the outside portion of the accommodating concave portions 32A are covered by the wound power spring 30B, and the outside portion of the corner portion 36B and the outside portion of the accommodating concave portions 32B are covered by the wound power spring 30A.) Then, the magnetic tapes T1 and T2 are wound outside the power springs 30A and 30B. Accordingly, even if there are uneven portions due to the corner portions 36A and 36B and the accommodating concave portions 32A and 32B, it is prevented that folded portions are formed on the magnetic tapes T1 and T2.

Moreover, because two magnetic tapes T1 and T2 are wound on the reel 20 at the same time, reading data from or writing data on the two magnetic tapes T1 and T2 are performed at the same time. Accordingly, time necessary to read data from or writing data on the two magnetic tapes of the present embodiment can be the half when compared with the conventional way. Accordingly, numbers of changing processes of the magnetic tape cartridges can be the half when compared with the conventional way. Therefore, troublesome of the processes is reduced.

In the present embodiment, the distal end portions 38A and 38B of the power springs 30A and 30B are subject to grinding process such that thicknesses of the distal end portions 38A and 38B become gradually thinner toward the distal ends thereof. However, the present embodiment is not limited to the same. Power springs whose thicknesses are thin may be used. In this case, it is not necessary to process (grind) the power springs.

Hereinafter, the operation of the first embodiment will be described in detail further by describing concrete examples.

A FIRST EXAMPLE

As shown in FIG. 8, the present example shows a drive device 39 in which two magnetic tape cartridges are accommodated at symmetry positions between which a reel 20 is sandwiched.

The drive device 39 reads data from and writes data on magnetic tapes T1 and T2 of accommodated magnetic tape cartridges C1 and C2 by respective heads 41A and 41B.

The reel 20 of the drive device 39 comprises a hub 26, a lower flange 24 and an upper flange 28. The hub 26 is fitted to the lower flange 24 so as to be integrated with the lower flange 24. The upper flange 28 is attached to the integrated hub 26 (see FIG. 9).

Concave portions 27A and 27B, and fitted grooves 29A and 29B are formed in the hub 26. The concave portions 27A and 27B are formed at symmetric positions with respect to a hub rotating axis Z. Also, the fitted grooves 29A and 29B are formed at symmetric positions with respect to the hub rotating axis Z. Power springs 30A and 30B are the same configuration.

Groove portions 25A and 25B are formed at an upper surface side of the lower flange 24. The groove portion 25A (25B) has a width gradually narrowing from a peripheral side of the lower flange 24 toward the accommodating concave portion 32A (32B), such that a leader pin 40A (40B) can be guided to the accommodating concave portion 32A (32B) of the power spring 30A (30B).

The leader pin 40A comprises a leader pin main body 42 and a leg portion 44. An end portion of a magnetic tape T1 is attached to the leader pin main body 42. The leg portion 44 protrudes downward from the leader pin main body 42, and are movable in a longitudinal direction thereof. A diameter of the leg portion 44 is smaller than that of the leader pin main body 42 (see FIGS. 10A and 10B). A flange portion 46 is formed at a lower end of the leader pin main body 42. An upper surface side of the flange portion 46 abuts a lower surface side of the hub 26 when the leader pin 40 is engaged with the reel 20. An accommodating chamber 48 which accommodates a compression coil spring 50 is formed in the leader pin main body 42. The leg portion 44 is urged downward by the compression coil spring 50. The leader pin 40B has the same configuration of the leader pin 40A.

A leg engaging portion 25C is formed at a position located at the deepest end of the groove portion 25A (at the hub side end of the groove portion 25A) and beneath the accommodating concave portion 32A. The leg portion 44 engages with the leg engaging portion 25C (see FIG. 9). Another leg engaging portion (not shown in the drawings) having the same configuration of the leg engaging portion 25C is formed at a position located at the deepest end of the groove portion 25B.

Hereinafter, the operation of the first example is given.

When the magnetic tape cartridge is loaded on the drive device, and the leader pin 40A is pulled out by the drawing device, the leader pin 40A is conveyed to an entrance of the groove portion 25A.

Further, the leader pin 40A is conveyed to the accommodating concave portion 32A in a state in which the compression coil spring 50 is contracted (compressed) due to the leg portion 44 being pressed from downward (see FIG. 10B). Namely, the leader pin 40A is conveyed in a state in which the leg portion 44 is slightly drawn inside the leader pin main body 42.

Figure 11A:
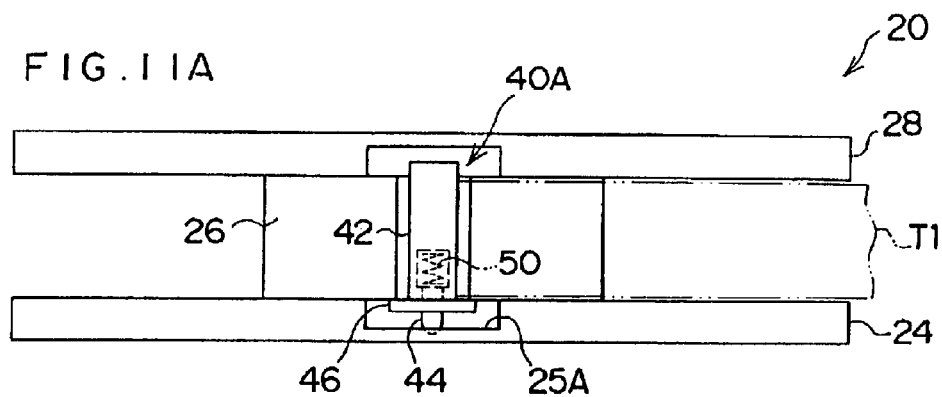
FIG. 11A is a side view illustrating a state in which the leader pins are held at the reel in the first example (power springs are omitted from this drawing).
Figure 11B:
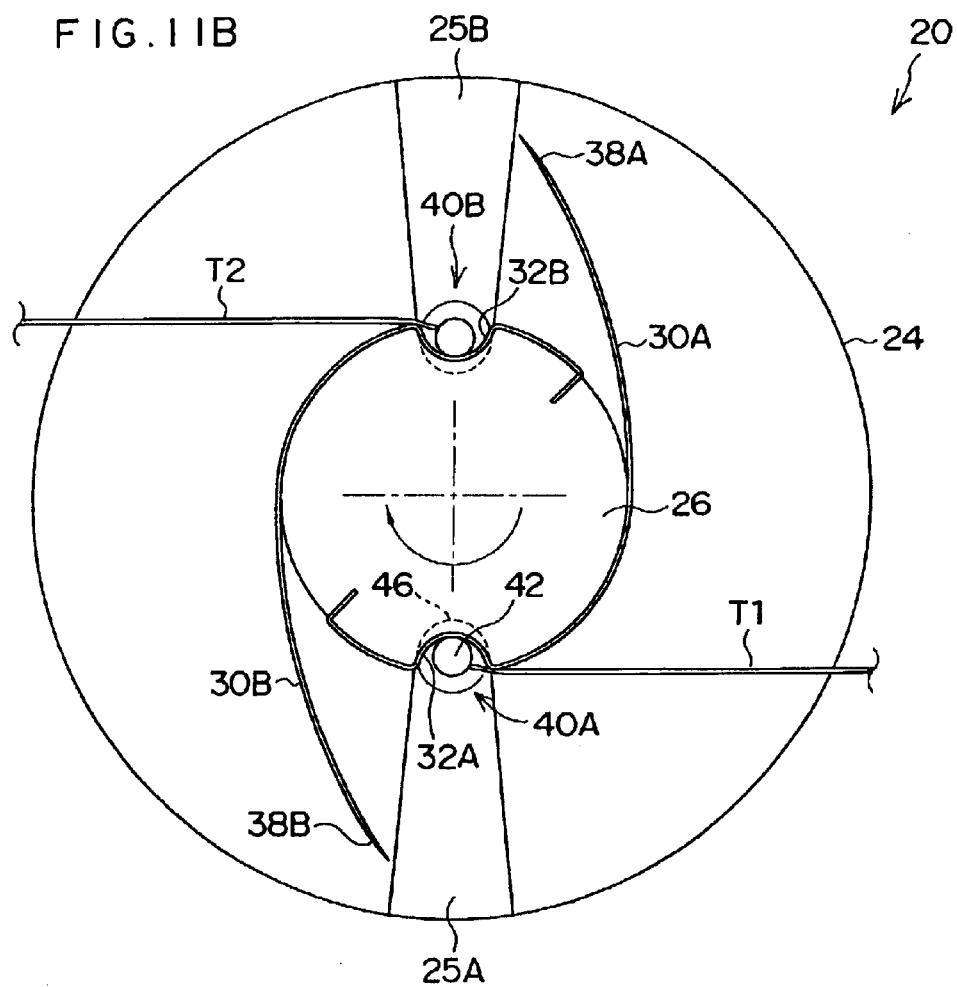
FIG. 11B is a plane view illustrating a state in which the leader pins are held at the reel in the first example (an upper flange is omitted from this drawing).

Then, an end portion of the leg portion 44 engages with the leg engaging portion 25C of the lower flange 24, due to pressing of the leg portion 44 from downward being released therefore the leg portion 44 extending (protruding). Further, the upper surface side of the flange portion 46 abuts the lower surface side of the hub 26. Therefore, the leader pin 40 is held at the reel 20 (see FIG. 11).

At the same time, the leader pin 40B is held at the reel 20 in the similar way of the leader pin 40A.

Thereafter, rotation of the reel 20 is started. The leader pins 40A and 40B are moved in the rotating direction of the reel 20 following with the rotation of the reel 20 (see FIGS. 4–7 explained in the first embodiment).

As already described above, when the reel 20 rotates, the magnetic tape T1 is wound from an outer surface side of the distal end portion 38A. In the similar way, the magnetic tape T2 is wound from an outer surface side of the distal end portion 38B. Because thicknesses of the distal end portions 38A and 38B become gradually thinner toward the respective distal ends thereof, it is prevented that uneven portions are formed at respective portions of the magnetic tapes, abutting outside the respective distal end portions 38A and 38B. Further, it is prevented that uneven portions are formed at portions of the magnetic tapes wound outside the respective those portions of the magnetic tapes (see FIG. 7).

As described above, in the present example, the leader pins 40A and 40B can be easily attached to or detached from the reel 20. Further, as shown in FIG. 8, because the drive device 39 accommodates the magnetic tape cartridges C1 and C2 in positions which are symmetric with respect to the reel 20, the elongated shaped drive device 39 (the drive device having small depth dimension thereof) can be realized.

A EXAMPLE 2

Figure 12:
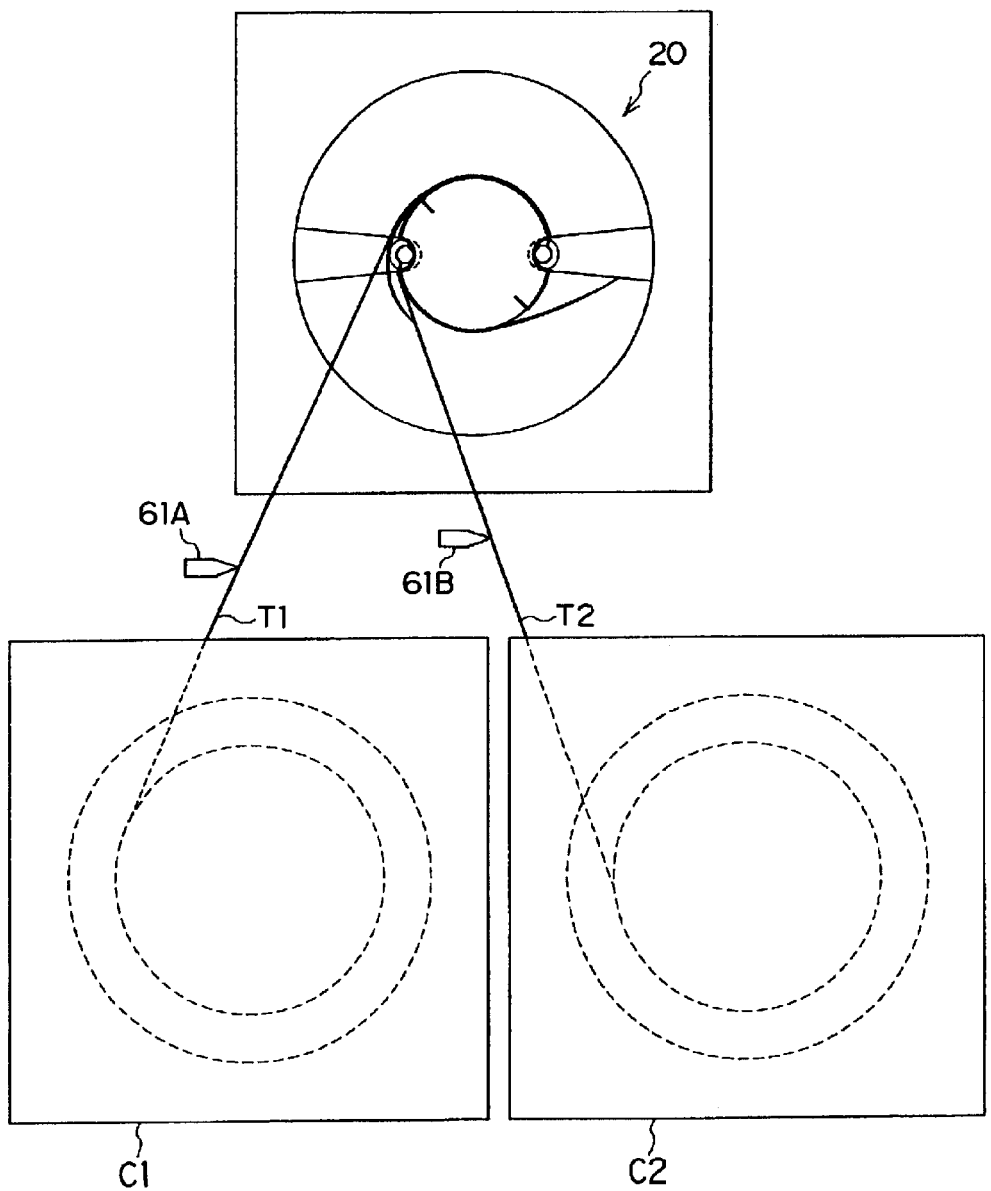
FIG. 12 is a schematic plane view illustrating structure of a drive device explained in a second example.
Figure 14A:
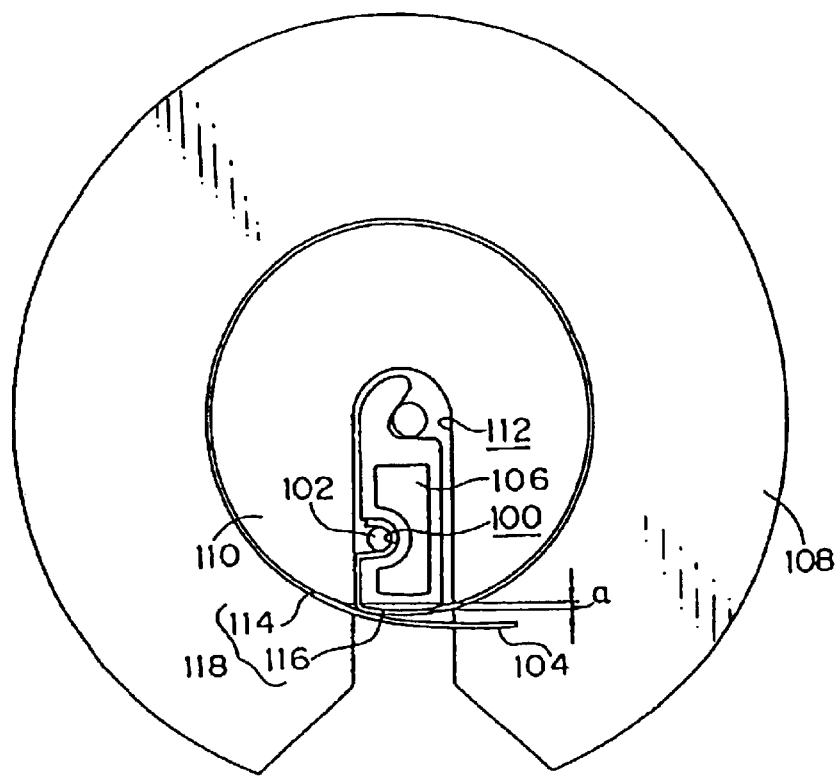
FIG. 14A is a plane view illustrating a conventional reel.
Figure 14B:
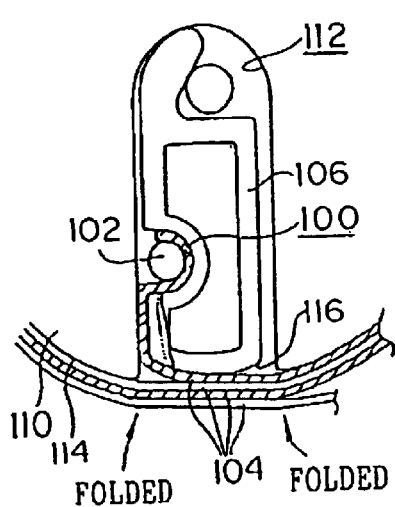
FIG. 14B is a partial enlarged plane view illustrating the conventional reel (a leader block is exceedingly retracted).
Figure 14C:
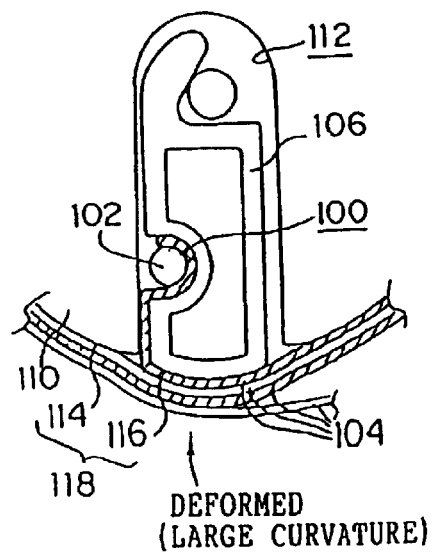
FIG. 14C is a partial enlarged plane view illustrating the conventional reel (the leader block is exceedingly protruded).

As shown in FIG. 12, the present example shows a drive device 59 in which two magnetic tape cartridges are accommodated at one side with respect to the reel 20.

The drive device 59 reads data from and writes data on magnetic tapes T1 and T2 of accommodated magnetic tape cartridges C1 and C2 by respective heads 61A and 61B.

Therefore, because the drive device 59 accommodates the two magnetic tape cartridges C1 and C2 at the one side with respect to the reel 20, it is prevented that the dimension of the drive device becomes large in one direction. Therefore, the compact drive device 59 (the drive device not having a large dimension thereof in one direction) can be realized.

A Second Embodiment

Hereinafter, the second embodiment will be described. As shown in FIG. 13, a drive device explained in the second embodiment is provided with a reel 60 which winds two magnetic tapes. In the second embodiment, the same reference numerals are applied to the same components, members and structures as those of the first embodiment and the descriptions thereof are omitted.

The reel 60 comprises a lower flange 24, an intermediate flange 66, an upper flange 28, a lower hub 65, and an upper hub 67. Diameter of the lower hub 65 is as the same as that of the upper hub 67, and the lower hub 65 and the upper hub 67 winds magnetic tapes, respectively. The intermediate flange 66 is sandwiched between the lower hub 65 and the upper hub 67. The lower flange 24 is attached at the lower side of the lower hub 65. The upper flange 28 is attached at the upper side of the upper hub 67. A power spring 70A is attached to the lower hub 65, and can be wound along a circumference surface (an outer peripheral surface) of the lower hub 65. A power spring 70B is attached to the upper hub 67, and can be wound along a circumference surface (an outer peripheral surface) of the upper hub 67.

An accommodating concave portion 32A, a base end portion 34A, a corner portion 36A are formed in the power spring 70A so as to correspond to a concave portion 27A and a fitted groove 29A formed in the lower hub 65.

A length of the power spring 70A is longer that that of the power spring 30A described in the first embodiment. Namely, the length of the power spring 70A is set such that a distal end portion 78A of the power spring 70A is positioned at a point which is beyond the corner portion 36A and the accommodating concave portion 32A in a tape winding direction (in a direction shown by an arrow P in FIG. 13) in a state in which the power spring 70A is wound on the lower hub 65 by the magnetic tape T1. Here, the tape winding direction is a direction opposite to a reel rotating direction. Namely, the length of the power spring 70A is longer than a circumference length of the lower hub 65.

In order that a step (an even portion) is not formed when the magnetic tape is wound from the outside of the distal end portion 78A, the distal end portion 78A is subject to grinding process such that a thickness of the distal end portion 78A becomes gradually thinner toward the distal end thereof. At a time of the grinding processing, the process is performed carefully such that burr and the like is not generated on the distal end portion 78A.

An accommodating concave portion 32B, a base end portion 34B, a corner portion 36B are formed in the power spring 70B so as to correspond to a concave portion 27B and a fitted groove 29B formed in the upper hub 67.

A length of the power spring 70B is as the same as that of the power spring 70A. Namely, the length of the power spring 70B is set such that a distal end portion 78B of the power spring 70B is positioned at a point which is beyond the corner portion 36B and the accommodating concave portion 32B in the tape winding direction in a state in which the power spring 70B is wound on the upper hub 67 by the magnetic tape T2. The distal end portion 78B of the power spring 70B has configuration which is the same as that of the distal end portion 78A of the power spring 70A.

In the drive device of the second embodiment, by rotating the reel 60, the magnetic tape T1 is wound by the lower hub 65 and the magnetic tape T2 is wound by the upper hub 67.

As described above, in the second embodiment, the magnetic tapes T1 and T2 are wound by the reel 60 at respective different levels. Namely, the magnetic tape T1 is wound by the reel 60 at a lower position and the magnetic tape T2 is wound by the reel 60 at a higher position. Accordingly, the drive device which can wind the magnetic tapes in a state in which the magnetic tapes does not contact each other can be realized.

In the second embodiment, magnetic cartridges can be accommodated in the drive device in the similar way of the first and the second examples of the first embodiment. Namely, two magnetic tape cartridges may be accommodated at symmetry positions between which a reel 20 is sandwiched, as shown in FIG. 8, or, two magnetic tape cartridges are accommodated at one side with respect to the reel 20, as shown in FIG. 12.

The embodiments and the examples of the present invention are explained above. However, those embodiments and the examples are preferable examples, and it will be appreciated that numerous changes and modifications are likely to occur, and it is intended to cover all changes and modifications which fall within the scope of the invention. Further, the scope of the present invention is not limited to the embodiments and the examples described above. For example, in the embodiments and the examples explained above, two magnetic tapes are wound on the reel (two magnetic tape cartridges are loaded on the drive device). However, it is possible that magnetic tapes of three or more are wound on the reel (magnetic tape cartridges of three or more are loaded on the drive device). Further, a power spring whose structure is different from the power spring described above can be applied to the present invention.

Because the present invention has the configurations described above, it is prevented that a region on a recording tape on which information cannot be recorded is generated or information recorded on the recording tape is lost doe to preventing that deformed portion is generated on the recording tape. Moreover, it is possible to easily read data from or write data on a recording tape cartridge in a short time.

What is claimed is:

1. A drive device having a reel on which recording tapes are wound, the drive device comprising:
a hub of the reel, in which a plurality of concave holding portions, for holding therein leader members to which distal ends of the recording tapes are attached, are formed, and on which the recording tapes are wound; and
flexible members which close the respective holding portions.

2. The drive device of claim 1, wherein a number of flexible members is equal to a number of the holding portions, which flexible members are wound on a peripheral surface of the hub by the recording tapes from peripheral surface sides so as to cover the respective holding portions.

3. The drive device of claim 1, wherein a plurality of the recording tapes are wound on the peripheral surface of the hub.

4. The drive device of claim 3, wherein a plurality of recording tape cartridges of the recording tapes are accommodated at the same side with respect to the reel.

5. The drive device of claim 3, wherein a plurality of recording tape cartridges of the recording tapes are accommodated at opposite sides with respect to the reel.

6. The drive device of claim 5, wherein the plurality of recording tape cartridges of the recording tapes are accommodated at substantially symmetrical positions with respect to the reel.

7. The drive device of claim 1, wherein a plurality of the recording tapes are respectively wound on different peripheral surfaces of the hub that are different in a direction of a rotation axis of the hub.

8. The drive device of claim 7, wherein a plurality of recording tape cartridges of the recording tapes are accommodated at the same side with respect to the reel.

9. The drive device of claim 7, wherein a plurality of recording tape cartridges of the recording tapes are accommodated at opposite sides with respect to the reel.

10. The drive device of claim 9, wherein the plurality of recording tape cartridges of the recording tapes are accommodated at substantially symmetrical positions with respect to the reel.

11. The drive device of claim 1, wherein:
a number of the flexible members is equal to a number of the holding portions;

the flexible members are curved and extend along the circumferential surface of the hub to radially cover respective ones of the concave holding portions;

distal ends of the flexible members resiliently stand radially outward from the circumferential surface of the hub when the recorded tapes are not wound around the hub; and distal ends of the flexible members contact the circumferential surface of the hub when the recording tapes are wound around the hub.

12. A reel on which recording tapes are wound, the reel comprising:

a hub, in which a plurality of concave holding portions, for holding therein leader members to which distal ends of the recording tapes are attached, are formed, and on which the recording tapes are wound; and flexible members which close the respective holding portions.

13. The reel of claim 12, wherein a number of flexible members is equal to a number of the holding portions, which flexible members are wound on a peripheral surface of the hub by the recording tapes from peripheral surface sides so as to cover the respective holding portions.

14. The reel of claim 12, wherein a plurality of the recording tapes are wound on the same peripheral surface of the hub.

15. The reel of claim 14, wherein the reel comprises a first flexible member and a second flexible member, and two recording tapes are wound on the hub, in which hub, a first holding portion;

a second holding portion;

a first engaged portion in which the first flexible member is engaged; and a second engaged portion in which the second flexible member is engaged, are formed, wherein the first holding portion and the second holding portion are formed in the hub at substantially symmetrical positions with respect to a rotation axis of the hub, and the first engaged portion and the second engaged portion are formed in the hub at substantially symmetrical positions with respect to a rotation axis of the hub.

16. The reel of claim 15, wherein the first flexible member covers the second holding portion and the second engaged portion, and the second flexible member covers the first holding portion and the first engaged portion.

17. The reel of claim 15, wherein thicknesses of tip end portions of the first flexible member and the second flexible member are respectively gradually thinner toward tip ends thereof.

18. The reel of claim 12, wherein a plurality of the recording tapes are respectively wound on different peripheral surfaces of the hub that are different in a direction of a rotation axis of the hub.

19. The reel of claim 18, wherein the hub comprises an upper hub disposed at an upper position in a direction of the rotation axis of the hub and a lower hub disposed at a lower position, two recording tapes being respectively wound on the upper hub and the lower hub.

20. The reel of claim 19, wherein the reel comprises a first flexible member and a second flexible member, and in the upper hub, a first holding portion; and a first engaged portion in which the first flexible member is engaged, are formed, and in the lower hub, a second holding portion; and a second engaged portion in which the second flexible member is engaged, are formed.

21. The reel of claim 20, wherein the first flexible member covers the first holding portion and the first engaged portion, and the second flexible member covers the second holding portion and the second engaged portion.

22. The reel of claim 12, wherein:

a number of the flexible members is equal to a number of the holding portions;

the flexible members are curved and extend along the circumferential surface of the hub to radially cover respective ones of the concave holding portions;

distal ends of the flexible members resiliently stand radially outward from the circumferential surface of the hub when the recording tapes are not wound around the hub; and distal ends of the flexible members contact the circumferential surface of the hub when the recording tapes are wound around the hub.

23. A drive device having a reel on which recording tapes are wound, the drive device comprising a hub of the reel, on which a plurality of holding portions, for holding leader members to which distal ends of the recording tapes are attached, are formed, and on which the recording tapes are wound, wherein a plurality of the recording tapes are wound on the peripheral surface of the hub.

24. The drive device of claim 23, wherein a plurality of recording tape cartridges of the recording tapes are accommodated at the same side with respect to the reel.

25. The drive device of claim 23, wherein a plurality of recording tape cartridges of the recording tapes are accommodated at opposite sides with respect to the reel.

26. The drive device of claim 25, wherein the plurality of recording tape cartridges of the recording tapes are accommodated at substantially symmetrical positions with respect to the reel.

27. A drive device having a reel on which recording tapes are wound, the drive device comprising a hub of the reel, on which a plurality of holding portions, for holding leader members to which distal ends of the recording tapes are attached, are formed, and on which the recording tapes are wound, wherein a plurality of the recording tapes are respectively wound on peripheral surfaces of the hub in a direction that differs from a direction of a rotation axis of the hub.

28. The drive device of claim 27, wherein a plurality of recording tape cartridges of the recording tapes are accommodated at the same side with respect to the reel.

29. The drive device of claim 27, wherein a plurality of recording tape cartridges of the recording tapes are accommodated at opposite sides with respect to the reel.

30. The drive device of claim 27, wherein the plurality of recording tape cartridges of the recording tapes are accommodated at substantially symmetrical positions with respect to the reel.

31. A reel on which recording tapes are wound, the reel comprising a hub, on which a plurality of holding portions, for holding leader members to which distal ends of the recording tapes are attached, are formed, and on which the recording tapes are wound, wherein a plurality of the recording tapes are wound on the peripheral surface of the hub.

32. The reel of claim 31, wherein the reel comprises a first flexible member and a second flexible member, and two recording tapes are wound on the hub, in which hub, a first holding portion;

a second holding portion;

a first engaged portion in which the first flexible member is engaged; and a second engaged portion in which the second flexible member is engaged, are formed, wherein the first holding portion and the second holding portion are formed in the hub at substantially symmetrical positions with respect to a rotation axis of the hub, and the first engaged portion and the second engaged portion are formed in the hub at substantially symmetrical positions with respect to a rotation axis of the hub.

33. The reel of claim 32, wherein the first flexible member covers the second holding portion and the second engaged portion, and the second flexible member covers the first holding portion and the first engaged portion.

34. The reel of claim 32, wherein thicknesses of tip end portions of the first flexible member and the second flexible member are respectively gradually thinner toward tip ends thereof.

35. A reel on which recording tapes are wound, the reel comprising a hub, on which a plurality of holding portions, for holding leader members to which distal ends of the recording tapes are attached, are formed, and on which the recording tapes are wound, wherein a plurality of the recording tapes are respectively wound on peripheral surfaces of the hub in a direction that differs from a direction of a rotation axis of the hub, distal ends of the flexible members resiliently stand radially outward from the circumferential surface of the hub when the recording tapes are not wound around the hub; and distal ends of the flexible members contact the circumferential surface of the hub when the recording tapes are wound around the hub.

36. The reel of claim 35, wherein the hub comprises an upper hub disposed at an upper position in a direction of the rotation axis of the hub and a lower hub disposed at a lower position, two recording tapes being respectively wound on the upper hub and the lower hub.

37. The reel of claim 36, wherein the reel comprises a first flexible member and a second flexible member, and in the upper hub, a first holding portion; and a first engaged portion in which the first flexible member is engaged, are formed, and in the lower hub, a second holding portion; and a second engaged portion in which the second flexible member is engaged, are formed.

38. The reel of claim 37, wherein the first flexible member covers the first holding portion and the first engaged portion, and the second flexible member covers the second holding portion and the second engaged portion.

* * * * *